US012509856B2

(12) United States Patent
Sasaki et al.

(10) Patent No.: US 12,509,856 B2
(45) Date of Patent: Dec. 30, 2025

(54) REMOTE OPERATION ASSISTANCE SERVER, REMOTE OPERATION ASSISTANCE SYSTEM, AND REMOTE OPERATION ASSISTANCE METHOD

(71) Applicant: KOBELCO CONSTRUCTION MACHINERY CO., LTD., Hiroshima (JP)

(72) Inventors: Hitoshi Sasaki, Hiroshima (JP); Yoichiro Yamazaki, Hiroshima (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 254 days.

(21) Appl. No.: 17/910,606

(22) PCT Filed: Jan. 7, 2021

(86) PCT No.: PCT/JP2021/000330
§ 371 (c)(1),
(2) Date: Sep. 9, 2022

(87) PCT Pub. No.: WO2021/192483
PCT Pub. Date: Sep. 30, 2021

(65) Prior Publication Data
US 2023/0279640 A1 Sep. 7, 2023

(30) Foreign Application Priority Data
Mar. 23, 2020 (JP) .................. 2020-051871

(51) Int. Cl.
*E02F 9/20* (2006.01)
*G08C 17/02* (2006.01)
*H04N 7/18* (2006.01)

(52) U.S. Cl.
CPC .............. *E02F 9/205* (2013.01); *G08C 17/02* (2013.01); *H04N 7/181* (2013.01)

(58) Field of Classification Search
CPC .......... E02F 9/205; G08C 17/02; H04N 7/181
See application file for complete search history.

(56) References Cited

U.S. PATENT DOCUMENTS

| 2014/0214240 A1* | 7/2014 | Funke ................. G05D 1/0291 701/2 |
| 2015/0054629 A1* | 2/2015 | Schulenberg .......... G08C 17/02 340/12.3 |

(Continued)

FOREIGN PATENT DOCUMENTS

| JP | 2001-182091 A | 7/2001 |
| JP | 2004-239166 A | 8/2004 |

(Continued)

OTHER PUBLICATIONS

The extended European Search Report dated Jun. 9, 2023 issued in the corresponding EP Patent Application No. 21775552.9.

*Primary Examiner* — Adnan M Mirza
(74) *Attorney, Agent, or Firm* — Carrier, Shende & Associates P.C.; Joseph P. Carrier; Jeffrey T. Gedeon

(57) ABSTRACT

When a remote operation of a work machine 40 through one remote operation apparatus 20 as a first remote operation apparatus is stopped by one operator, operation of an engine 460 of the work machine 40 is continued without being stopped if another operator who may possibly continuously remotely operate the same work machine 40 through another remote operation apparatus 20 as a second remote operation apparatus exists. Therefore, the other operator can immediately remotely operate the work machine 40 through the second remote operation apparatus without causing the engine 460 of the work machine 40, which has been an operation target of the first remote operation apparatus so far, to restart and perform warm-up operation.

6 Claims, 6 Drawing Sheets

(56) References Cited

U.S. PATENT DOCUMENTS

2020/0174465 A1\* 6/2020 Minagawa .............. E02F 9/267
2021/0002860 A1 1/2021 Otani et al.

FOREIGN PATENT DOCUMENTS

| JP | 2010-273344 A | 12/2010 |
| JP | 2011-208568 A | 10/2011 |
| JP | 2016-212503 A | 12/2016 |
| JP | 2019-176401 A | 10/2019 |

\* cited by examiner

REMOTE OPERATION ASSISTANCE SERVER, REMOTE OPERATION ASSISTANCE SYSTEM, AND REMOTE OPERATION ASSISTANCE METHOD

TECHNICAL FIELD

The present invention relates to a technology for assisting remote operations of a plurality of work machines through remote operation apparatuses by operators.

BACKGROUND ART

There is proposed a technology for, by causing a picked-up image acquired through a camera (a work machine image pickup apparatus) mounted on a work machine such as a construction machine to be displayed on a monitor constituting a remote operation apparatus, assisting a remote operation of the work machine through the remote operation apparatus (see, for example, Patent Literature 1). When the remote operation of the work machine through the remote operation apparatus ends, operation of the engine (the motor) of the work machine is stopped.

CITATION LIST

Patent Literature

Patent Literature 1: Japanese Patent Laid-Open No. 2019-176401

SUMMARY OF INVENTION

Technical Problem

However, when, shortly after a remote operation of a work machine through one remote operation apparatus by one operator ends, another operator tries a remote operation of the same work machine through another remote operation apparatus, it is necessary to restart the engine of the work machine, and there is a possibility that smoothness of work by the work machine is impaired accordingly.

Therefore, an object of the present invention is to provide a technology for making it possible to, when the same work machine is remotely operated by different operators or through different remote operation apparatuses, smoothly perform work of the work machine.

Solution to Problem

A remote operation assistance server of the present invention is a remote operation assistance server for assisting a remote operation of a work machine through a remote operation apparatus by an operator, the remote operation assistance server, and comprises:

a first assistance processing element which, when recognizing that a remote operation of the work machine by a first remote operation apparatus ends, based on communication with at least one of the first remote operation apparatus and the work machine, confirms, based on communication with a second remote operation apparatus different from the first remote operation apparatus, whether a possibility of a remote operation of the work machine by an operator of the second remote operation apparatus exists or not; and a second assistance processing element which, when it is confirmed by the first assistance processing element that the possibility of the remote operation of the work machine by the operator of the second remote operation apparatus does not exist, stops operation of an engine of the work machine in response to receiving a remote operation stop instruction for the work machine being received from the first remote operation apparatus, and, when it is confirmed by the first assistance processing element that the possibility of the remote operation of the work machine by the operator of the second remote operation apparatus exists, causes the operation of the engine of the work machine to continue even after receiving the remote operation stop instruction for the work machine from the first remote operation apparatus.

A remote operation assistance system comprises the remote operation assistance server of the present invention, the first remote operation apparatus and the second remote operation apparatus.

According to the remote operation assistance system in the above configuration and the remote operation assistance server constituting the remote operation assistance system (hereinafter referred to as "the remote operation assistance server and the like"), when a remote operation of a work machine through the first remote operation apparatus is stopped by one operator, operation of the engine of the work machine is stopped if another operator who may possibly remotely operate the same work machine through the second remote operation apparatus does not exist. Here, "who may possibly remotely operate . . ." is a concept that includes the operator of the second remote operation apparatus having scheduled to perform a remote operation of the work machine and/or that the operator expressing an intention to perform a remote operation.

On the other hand, when the remote operation of the work machine through the first remote operation apparatus is stopped by the one operator, the operation of the engine of the work machine is continued without being stopped if another operator who may possibly continuously remotely operate the same work machine through the second remote operation apparatus exists. Therefore, the other operator can immediately remotely operate the work machine through the second remote operation apparatus without causing the engine of the work machine, which has been an operation target of the first remote operation apparatus so far, to restart and perform warm-up operation. Therefore, when the same work machine is remotely operated by different operators or through different remote operation apparatuses, work of the work machine can be smoothly performed.

In the remote operation assistance server and the like of the present invention, it is favorable that the first assistance processing element acquires picked-up image data indicating an operation state and a surrounding environment of the work machine, the picked-up image data being acquired through an image pickup apparatus, causes an output interface of the second remote operation apparatus to output a work environment image corresponding to the picked-up image data and then confirms whether the possibility of the remote operation of the work machine by the operator of the second remote operation apparatus exists or not, based on communication with the second remote operation apparatus.

According to the remote operation assistance server and the like in the above configuration, it is possible to cause an operation state and a surrounding environment of a work machine remotely operated by one operator through a first remote operation apparatus to be recognized by another operator and cause the other operator to decide whether or not to continuously remotely operate the same work machine through a second remote operation apparatus. Since it is possible for the other operator to take over the remote operation of the work machine after recognizing the operation situation and surrounding environment of the work machine, the other operator can immediately remotely operate the work machine without an uncomfortable feeling. Therefore, when the same work machine is remotely operated by different operators or through different remote operation apparatuses, work of the work machine can be smoothly performed.

DESCRIPTION OF EMBODIMENTS (Configuration of Remote Operation Assistance System)

Figure 1:
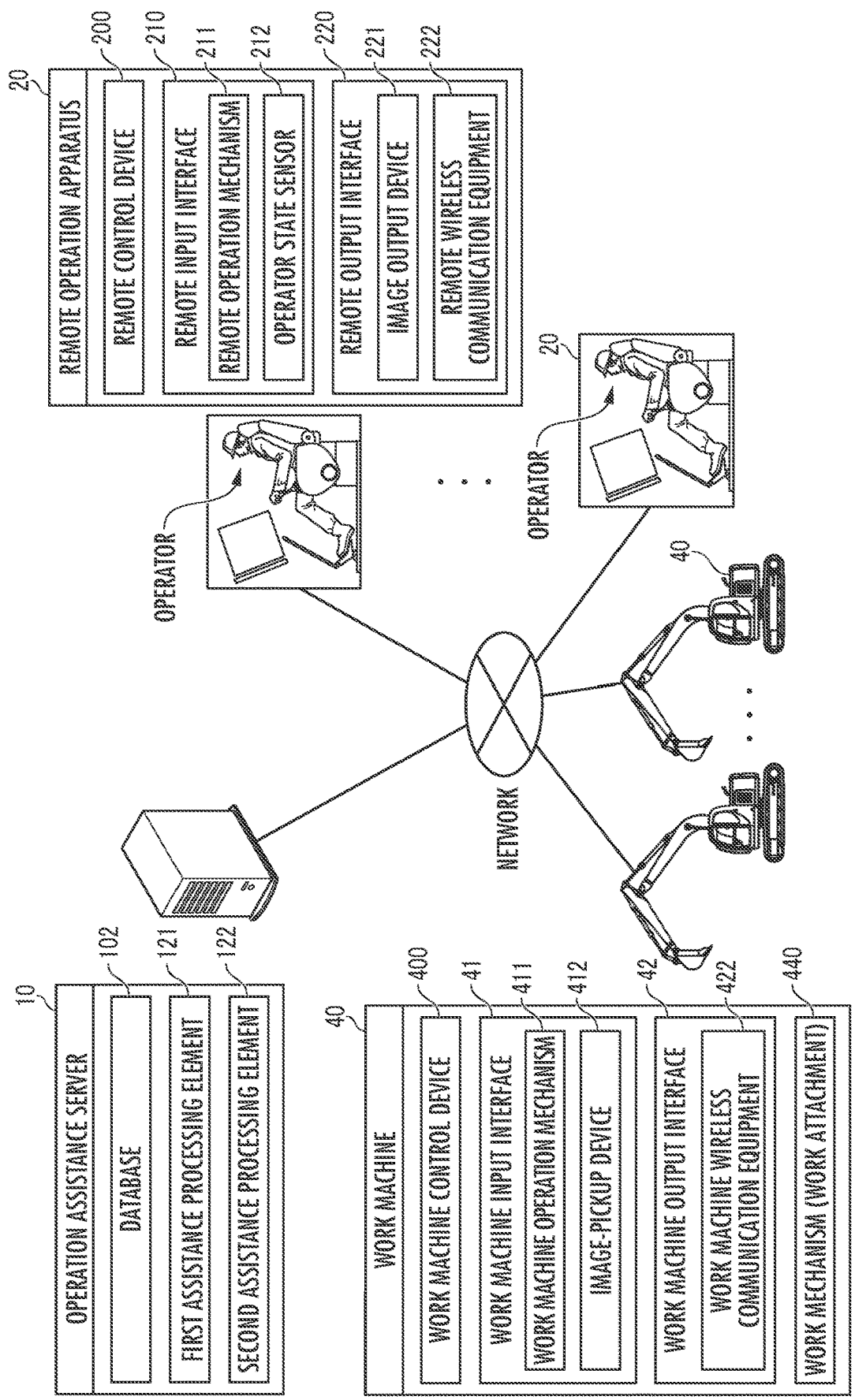
FIG. 1 is a diagram about a configuration of a remote operation assistance system as an embodiment of the present invention.

A remote operation assistance system as an embodiment of the present invention shown in FIG. 1 comprises a remote operation assistance server 10 and remote operation apparatuses 20 (clients) for remotely operating work machines 40. The remote operation assistance server 10, the remote operation apparatuses 20, the work machines 40 and clients 60 are configured to be capable of mutually performing network communication. A mutual communication network between the remote operation assistance server 10 and the remote operation apparatuses 20 and a mutual communication network between the remote operation assistance server 10 and the work machines 40 may be the same or may be different.

(Configuration of Remote Operation Assistance Server)

The remote operation assistance server 10 comprises a database 102, a first assistance processing element 121 and a second assistance processing element 122. The database 102 stores and holds picked-up image data and the like. The database 102 may comprise a database server separate from the remote operation assistance server 10. Each assistance processing element comprises an arithmetic processing device (a single-core processor, a multi-core processor or a processor core constituting the multi-core processor), and the assistance processing element reads necessary data and software from a storage device such as a memory and executes arithmetic processing described later according to the software for the data.

(Configuration of Remote Operation Apparatus)

Each remote operation apparatus 20 comprises a remote control device 200, a remote input interface 210 and a remote output interface 220. The remote operation apparatus 20 functions as at least one of "a first remote operation apparatus" and "a second remote operation apparatus". The remote control device 200 comprises an arithmetic processing device (a single-core processor, a multi-core processor or a processor core constituting the multi-core processor), and the remote control device 200 reads necessary data and software from a storage device such as a memory and executes arithmetic processing according to the software for the data. The remote input interface 210 comprises a remote operation mechanism 211. The remote output interface 220 comprises an image output device 221 and remote wireless communication equipment 222. The remote operation apparatus 20 may comprise a mobile information terminal such as a smartphone or a tablet terminal.

The remote operation mechanism 211 includes a travel operation device, a turning operation device, a boom operation device, an arm operation device and a bucket operation device. Each operation device has an operation lever to receive a rotation operation. The operation lever of the travel operation device (a travel lever) is operated to move a lower travel body 410 of a work machine 40. The travel lever may also serve as a travel pedal. For example, a travel pedal fixed to the base or lower end part of the travel lever may be provided. The operation lever of the turning operation device (a turning lever) is operated to move a hydraulic turning motor constituting a turning mechanism 430 of the work machine 40. The operation lever of the boom operation device (a boom lever) is operated to move a boom cylinder 442 of the work machine 40. The operation lever of the arm operation device (an arm lever) is operated to move an arm cylinder 444 of the work machine 40. The operation lever of the bucket operation device (a bucket lever) is operated to move a bucket cylinder 446 of the work machine 40.

Figure 2:
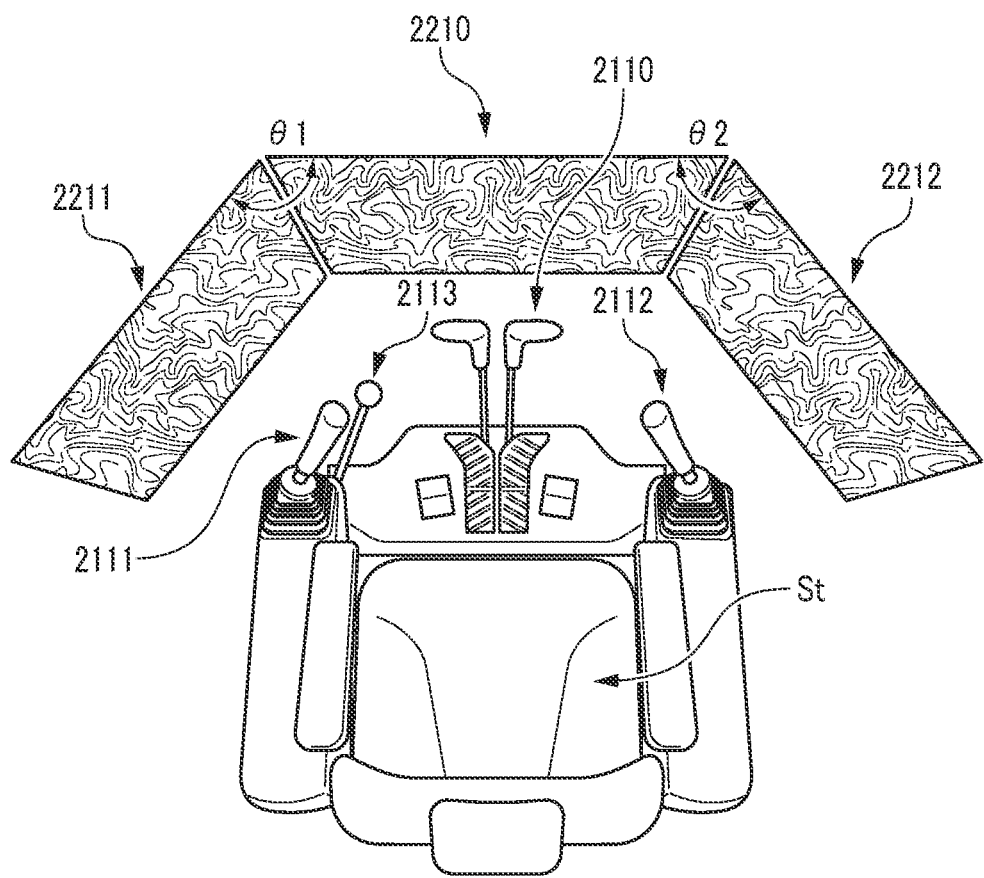
FIG. 2 is a diagram about a configuration of a remote operation apparatus.

The operation levers constituting the remote operation mechanism 211 are arranged, for example, around a seat St for an operator to be seated as shown in FIG. 2. Though the seat St is in a form like a high back chair with armrests, it may be a seating part in an arbitrary form on which an operator can sit, such as a form like a low back chair without a headrest or a form like a chair without a backrest.

In front of the seat St, a pair of left and right travel levers 2110 corresponding to left and right crawlers are arranged left and right, side by side. One operation lever may serve as a plurality of operation levers. For example, a left-side operation lever 2111 provided in front of a left-side frame of the seat St shown in FIG. 2 may function as an arm lever when operated in a front/back direction and function as a turning lever when operated in a left-right direction. Similarly, a right-side operation lever 2112 provided in front of a right-side frame of the seat St shown in FIG. 2 may function as a boom lever when operated in the front/back direction and function as a bucket lever when operated in the left-right direction. The lever patterns may be arbitrarily changed by an operation instruction by an operator.

A shutoff lever 2113 provided below the left-side operation lever 2111 in front of the left-side frame of the seat St functions as an operation lever for, when being raised, locking the work machine 40 so that the work machine 40 does not move even if each of the operation levers 2110, 2111 and 2112 is operated and, when being lowered, releasing the lock.

For example, as shown in FIG. 2, the image output device 221 comprises a central image output device 2210, a left-side image output device 2211 and a right-side image output device 2212 that are arranged in front of, diagonally forward left of and diagonally forward right of the seat St, respectively, each of the image output devices having an almost rectangular-shaped screen. The shapes and sizes of the screens (image display areas) of the central image output device 2210, the left-side image output device 2211 and the right-side image output device 2212 may be the same or may be different.

As shown in FIG. 2, the right edge of the left-side image output device 2211 adjoins the left edge of the central image output device 2210 such that the screen of the central image output device 2210 and the screen of the left-side image output device 2211 form a tilt angle θ1 (for example, 120°≤θ1≤150°). As shown in FIG. 2, the left edge of the right-side image output device 2212 adjoins the right edge of the central image output device 2210 such that the screen of the central image output device 2210 and the screen of the right-side image output device 2212 form a tilt angle θ2 (for example, 120°≤θ2≤150°). The tilt angles θ1 and θ2 may be the same or different.

Each of the screens of the central image output device 2210, the left-side image output device 2211 and the right-side image output device 2212 may be parallel to the vertical direction or may be inclined relative to the vertical direction. At least one image output device among the central image output device 2210, the left-side image output device 2211 and the right-side image output device 2212 may comprise a plurality of divided image output devices. For example, the central image output device 2210 may comprise a pair of image output devices that vertically adjoin each other, each of the image output devices having an almost rectangular-shaped screen. Each of the image output devices 2210 to 2212 may further comprise a speaker (a voice output device).

(Configuration of Work Machine)

Each work machine 40 comprises a work machine control device 400, a work machine input interface 41, a work machine output interface 42, a work mechanism 440 and an engine 460. The work machine control device 400 comprises an arithmetic processing device (a single-core processor, a multi-core processor or a processor core constituting the multi-core processor), and the work machine control device 400 reads necessary data and software from a storage device such as a memory and executes arithmetic processing according to the software for the data.

Figure 3:
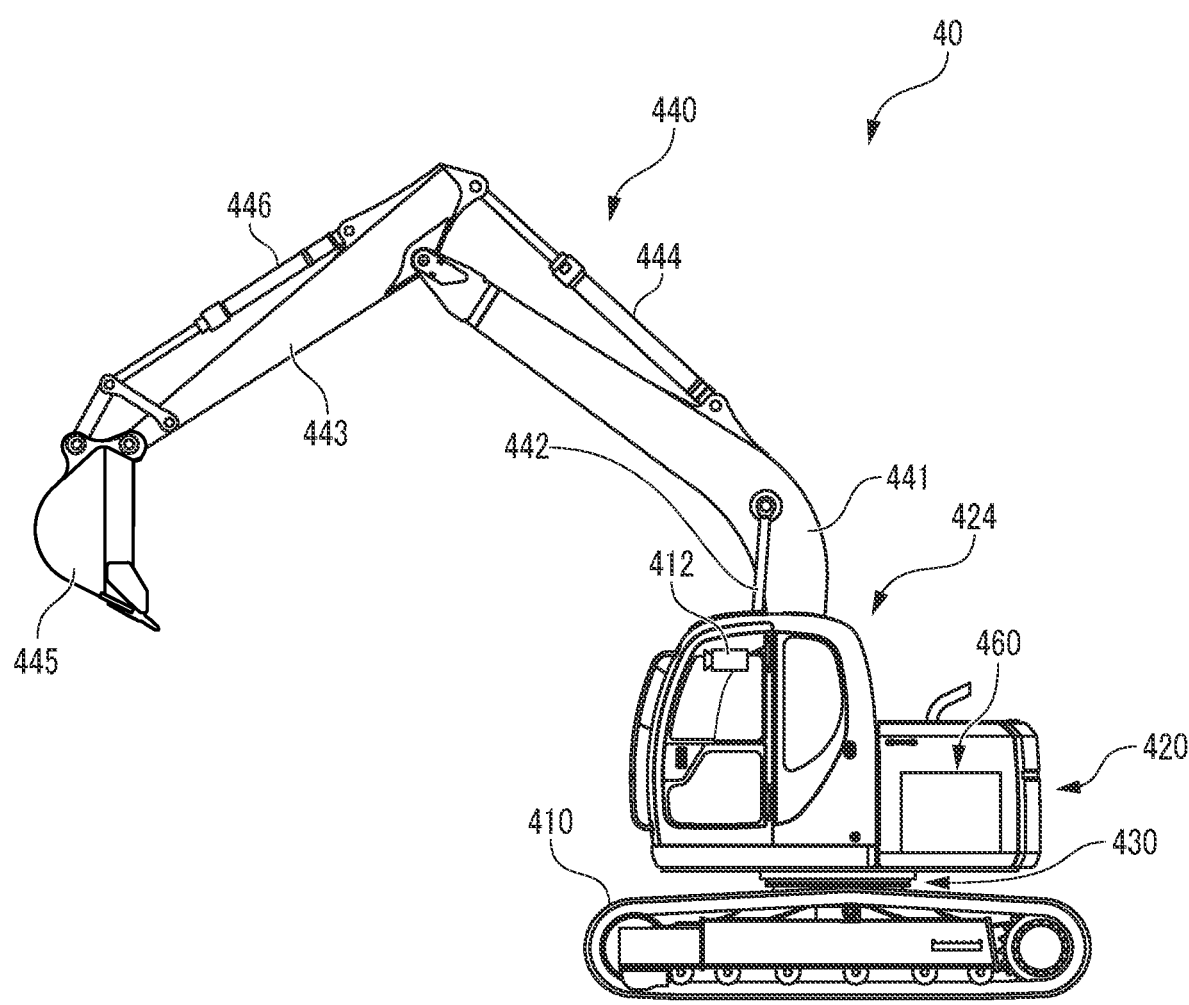
FIG. 3 is a diagram about a configuration of a work machine.

The work machine 40 is, for example, a crawler shovel (a construction machine) and comprises the crawler-type lower travel body 410, an upper turning body 420 that is turnably mounted on the lower travel body 410 via the turning mechanism 430 as shown in FIG. 3. On the front left side part of the upper turning body 420, a cab 424 (a driving room) is provided. On the front center part of the upper turning body 420, the work mechanism 440 is provided.

The work machine input interface 41 comprises a work machine operation mechanism 411 and a work machine image-pickup device 412. The work machine operation mechanism 411 comprises a plurality of operation levers arranged similarly to those of the remote operation mechanism 211 around a seat arranged inside the cab 424. A driving mechanism or robot that receives a signal corresponding to an operation aspect of a remote operation lever and moves a work machine operation lever based on the received signal is provided in the cab 424. The work machine image-pickup device 412 is installed, for example, inside the cab 424 and picks up an image of an environment that includes at least a part of the work mechanism 440 through a front window and a pair of left and right side windows. A part or all of the front window and side windows may be omitted.

The work machine output interface 42 comprises work machine wireless communication equipment 422.

The work mechanism 440 comprises a boom 441 fitted to the upper turning body 420 in a manner of being capable of being raised, an arm 443 rotatably coupled with the tip of the boom 441 and a bucket 445 rotatably coupled with the tip of the arm 443. The boom cylinder 442, the arm cylinder 444 and the bucket cylinder 446 that comprise telescopic hydraulic cylinders, respectively, are fitted to the work mechanism 440.

The boom cylinder 442 is interposed between the boom 441 and the upper turning body 420 so as to, by extending and retracting by receiving supply of hydraulic oil, cause the boom 441 to rotate in a direction of being raised. The arm cylinder 444 is interposed between the arm 443 and the boom 441 so as to, by extending and retracting by receiving supply of hydraulic oil, cause the arm 443 to rotate around a horizontal axis relative to the boom 441. The bucket cylinder 446 is interposed between the bucket 445 and the arm 443 so as to, by extending and retracting by receiving supply of hydraulic oil, cause the bucket 445 to rotate around a horizontal axis relative to the arm 443.

The engine 460 is a driving source of the work machine 40 and can drive a main pump and a pilot pump. In a state in which the engine 460 is operating, hydraulic oil can be supplied from the main pump to a plurality of direction control valves, and primary pressure oil is supplied from the pilot pump to the work machine operation mechanism 411. By secondary pressure oil being supplied to a direction control valve according to a movement corresponding to a remote operation instruction of the work machine operation mechanism 411 and hydraulic oil being supplied to a hydraulic cylinder corresponding to operation of the direction control valve, the turning mechanism 430 and the work mechanism 440 operate. Hereinafter, the state in which the engine 460 is operating and a state in which the engine 460 is stopped will be called ON and OFF, respectively.

(First Function)

A first function of the remote operation assistance system in the above configuration will be described using a flowchart shown in FIG. 4. In the flowchart, each block indicated by "C." is used to simplify description, means transmission and/or reception of data and means such a conditional branch that processing in a branch direction is executed under the condition of transmission and/or reception of the data.

Figure 4:
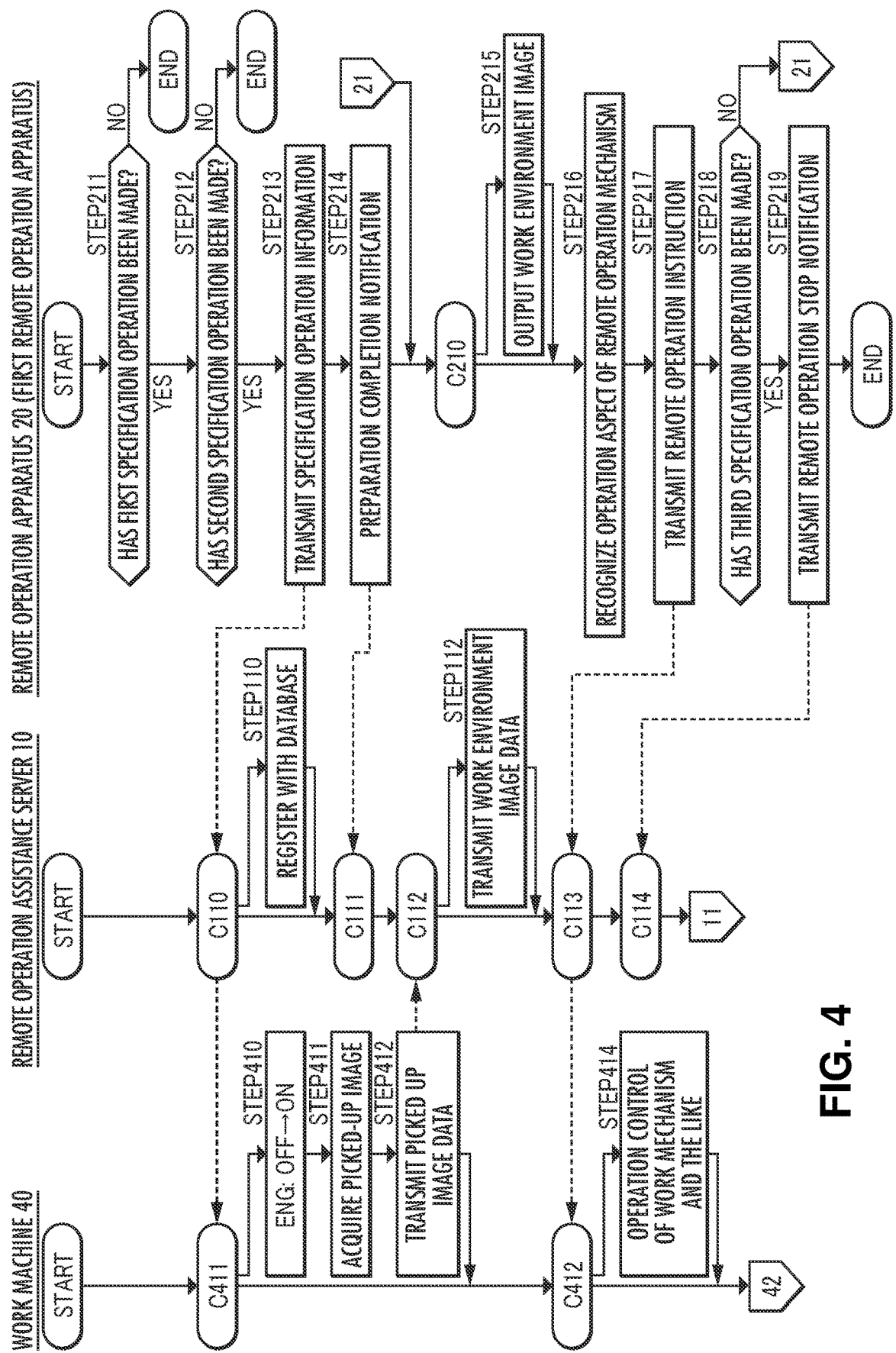
FIG. 4 is a diagram about a first function of the remote operation assistance system.

In a remote operation apparatus 20 as a first remote operation apparatus, it is determined by an operator whether a first specification operation through the remote input interface 210 has been performed or not (FIG. 4/STEP 211). The "first specification operation" is, for example, an operation such as tapping or swiping on the remote input interface 210 for specifying a work machine 40 that the operator intends to remotely operate.

If a result of the determination is negative (FIG. 4/STEP 211: NO), a determination process about whether the first specification operation has been performed or not (FIG. 4/STEP 211) is repeated. On the other hand, if the result of the determination is positive (FIG. 4/STEP 211: YES), it is determined by the operator whether a second specification operation through the remote input interface 210 has been performed or not in the remote operation apparatus 20 as the first remote operation apparatus (FIG. 4/STEP 212). The "second specification operation" is, for example, an operation such as key touching, tapping or swiping on the remote input interface 210 for setting a schedule including scheduled start time (first scheduled start time) and scheduled end time (first scheduled end time) of a remote operation of a work machine 40 specified by the first specification operation. This schedule may be registered with the database 102 in advance. The schedule may be set by a terminal apparatus such as a smartphone, a tablet terminal or a personal computer.

If a result of the determination is negative (FIG. 4/STEP 212: NO), a process of and after the determination about whether the first specification operation has been performed or not (FIG. 4/STEP 211) is repeated. On the other hand, if the result of the determination is positive (FIG. 4/STEP 212: YES), specification operation information is transmitted to the remote operation assistance server 10 through the remote wireless communication equipment 222 (FIG. 4/STEP 213). The specification operation information includes a remote identifier for identifying the remote operation apparatus 20, a work machine identifier for identifying the work machine 40 specified by the first specification operation, the schedule including the first scheduled start time and the first scheduled end time of the remote operation, which has been specified by the second specification operation.

In the remote operation assistance server 10, when the specification operation information is received (FIG. 4/C110), the specification operation information is registered with the database 102 (FIG. 4/STEP 110).

In the remote operation apparatus 20, a preparation completion notification to the effect that preparation for the remote operation has been made is transmitted to the remote operation assistance server 10 via the remote wireless communication equipment 222 in responses to a specified trigger (FIG. 4/STEP 214). As the specified trigger, the operator pressing a preparation completion button that constitutes the remote input interface 210, the operator being seated on the seat St, or the like is detected. However, when the specified trigger occurs more than a predetermined time (for example, 10 minutes) before the first scheduled start time, the preparation completion notification may not be transmitted. The preparation completion notification includes the remote identifier.

In the remote operation assistance server 10, when the preparation completion notification is received, the preparation completion notification is transmitted to the work machine 40 identified by the work machine identifier that is stored and hold in or registered with the database 102 in association with the remote identifier included in the preparation completion notification, by the first assistance processing element 121 (FIG. 4/C111).

In the work machine 40, when the preparation completion notification is received through the work machine wireless communication equipment 422 (FIG. 4/C410), the engine 460 of the work machine 40 is switched from ON to OFF by the work machine control device 400 (FIG. 4/STEP 410). Thereby, for example, the primary pressure oil supplied from the pilot pump can be supplied to the direction control valves as the secondary pressure oil (by the operation aspect of the work machine operation mechanism 411 being adjusted by an actuator) in response to a remote operation instruction, and, therefore, the work machine 40, including the turning mechanism 430 and the work mechanism 440, is into an operable state.

Furthermore, the work machine control device 400 acquires a picked-up image through the work machine image-pickup device 412 (FIG. 4/STEP 411). Picked-up image data indicating the picked-up image is transmitted to the remote operation assistance server 10 by the work machine control device 400 through the work machine wireless communication equipment 422 (FIG. 4/STEP 412).

In the remote operation assistance server 10, when the picked-up image data is received (FIG. 4/C111), work environment image data according to the picked-up image is transmitted to the remote operation apparatus 20 by the second assistance processing element 122 (FIG. 4/STEP 112). The work environment image data includes, in addition to the picked-up image data itself, image data indicating a simulated work environment image generated based on the picked-up image.

In the remote operation apparatus 20, when the work environment image data is received through the remote wireless communication equipment 222 (FIG. 4/C210), a work environment image corresponding to the work environment image data is outputted on the image output device 221 by the remote control device 200 (FIG. 4/STEP 215).

Figure 6:
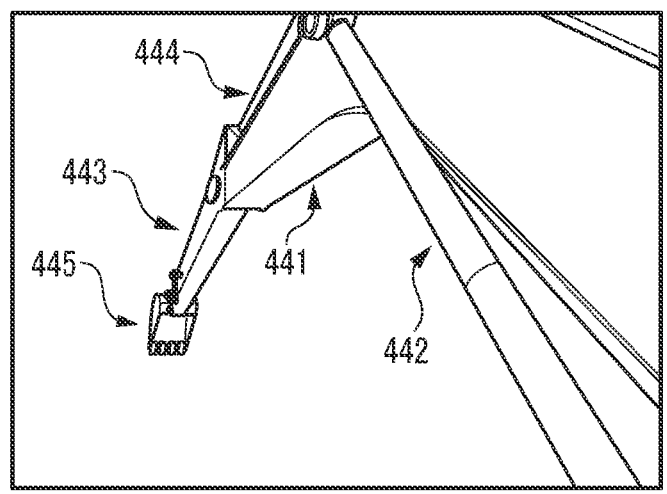
FIG. 6 is a diagram about a work environment image.

Thereby, for example, as shown in FIG. 6, a work environment image with the boom 441, the arm 443 and the bucket 445, which are parts of the work mechanism 440, being reflected therein is outputted on the image output device 221.

In the remote operation apparatus 20, an operation aspect of the remote operation mechanism 211 is recognized by the remote control device 200 (FIG. 4/STEP 216), and a remote operation instruction corresponding to the operation aspect is transmitted to the remote operation assistance server 10 through the remote wireless communication equipment 222 (FIG. 4/STEP 217). The operation aspect may not be recognized until the first scheduled start time comes, or the remote operation instruction may not be transmitted to the remote operation assistance server 10 even if the operation aspect is recognized.

In the remote operation assistance server 10, when the remote operation instruction is received by the second assistance processing element 122, the remote operation instruction is transmitted to the work machine 40 by the second assistance processing element 122 (FIG. 4/C113).

In the work machine 40, when the remote operation instruction is received through the work machine wireless communication equipment 422 (FIG. 4/C412), operations of the work mechanism 440 and the like are controlled by the work machine control device 400 (FIG. 4/STEP 414). Thereby, a remote operation of the work machine 40 is started. For example, work of scooping dirt in front of the work machine 40 by the bucket 445, causing the upper turning body 420 to turn and dropping the dirt from the bucket 445 is executed.

In the remote operation apparatus 20, it is determined by the operator whether a third specification operation through the remote input interface 210 has been performed or not (FIG. 4/STEP 218). The "third specification operation" is, for example, an operation such as tapping on the remote input interface 210 for causing operation of the engine 460 of the work machine 40 to stop, such as switching the IGN switch from ON to OFF.

Figure 5:
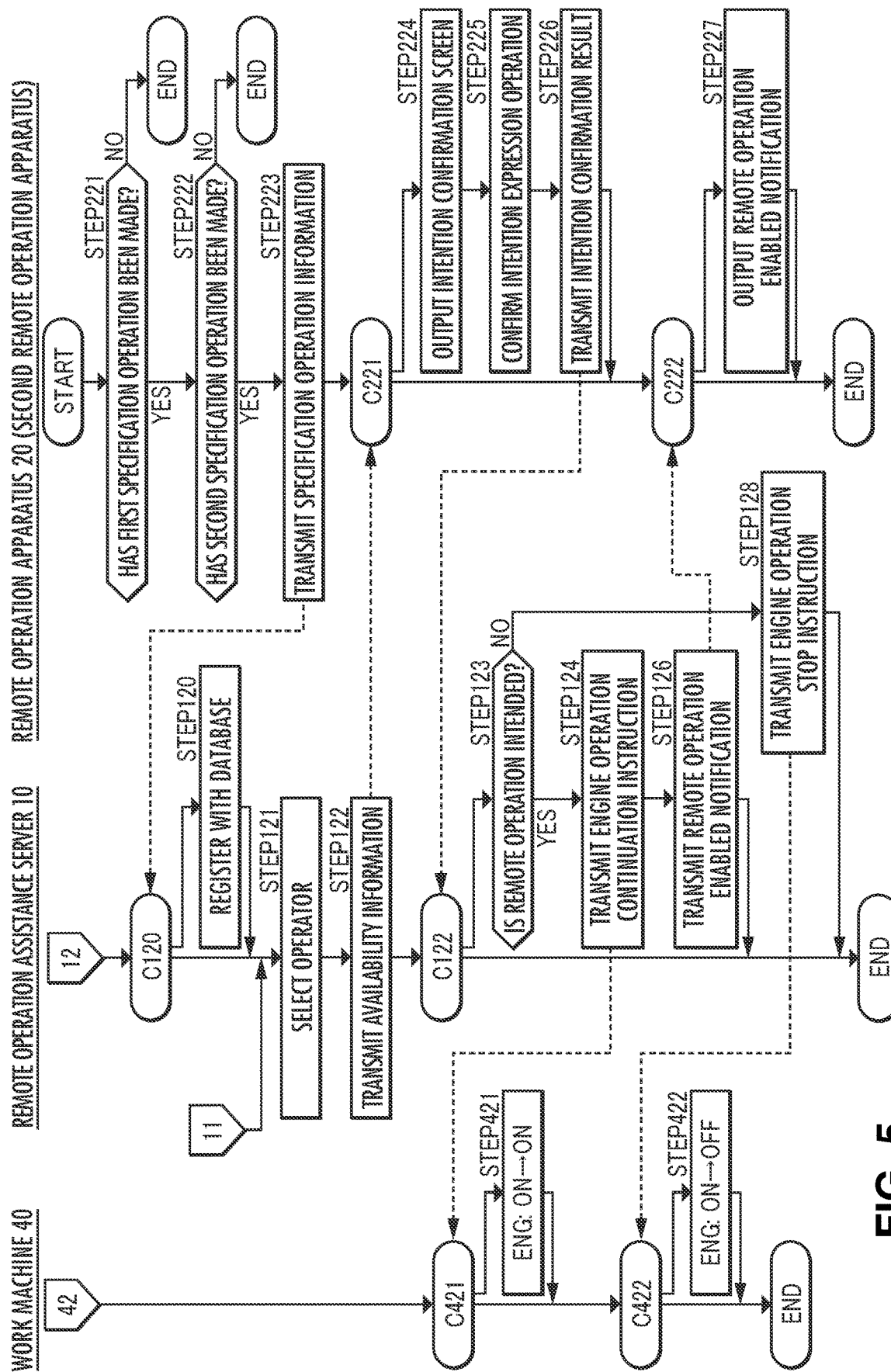
FIG. 5 is a diagram about a second function of the remote operation assistance system.

If a result of the determination is negative (FIG. 5/STEP 218: NO), a process of and after the reception of work environment image data through the remote wireless communication equipment 222 (see FIG. 4/C210) and the output of a work environment image corresponding to the work environment image data on the image output device 221 (see FIG. 4/STEP 215) is repeated. On the other hand, if the result of the determination is positive (FIG. 5/STEP 218: YES), a remote operation stop notification (or a remote operation stop instruction) is transmitted to the remote operation assistance server 10 through the remote wireless communication equipment 222 (FIG. 4/STEP 219). The remote operation stop notification includes the work machine identifier for identifying the work machine 40.

The third specification operation may be an operation for stopping the operation of the engine 460 of the work machine 40 after specified time, and the remote operation stop notification may be an instruction for stopping the operation of the engine 460 of the work machine 40 after the specified time. In this case, it becomes possible to continue the remote operation of the work machine 40 by the first remote operation apparatus until the specified time after the third specification operation being performed (see FIG. 4/STEP 216→STEP 217→ . . . →STEP 414).

In the remote operation assistance server 10, when the remote operation stop notification is received (FIG. 4/C114), a process described later using FIG. 5 is executed. In the remote operation assistance server 10, if the remote operation stop notification is not received, the process of and after the reception of picked-up image data (see FIG. 4/C112) and the transmission of work environment image data (see FIG. 4/STEP 112) is repeated.

(Second Function)

A second function of the remote operation assistance system in the configuration described before will be described using a flowchart shown in FIG. 5. In the flowchart, each block indicated by "C." is used to simplify description, means transmission and/or reception of data, and means such a conditional branch that processing in a branch direction is executed under the condition of transmission and/or reception of the data.

In a remote operation apparatus 20 as a second remote operation apparatus, it is determined by an operator whether a first specification operation through the remote input interface 210 has been performed or not (FIG. 5/STEP 221).

If a result of the determination is negative (FIG. 5/STEP 221: NO), a process of and after the determination about whether the first specification operation has been performed or not (FIG. 5/STEP 221) is repeated. On the other hand, if the result of the determination is positive (FIG. 5/STEP 221: YES), it is determined by the operator whether a second specification operation through the remote input interface 210 has been performed or not in the remote operation apparatus 20 as the second remote operation apparatus (FIG. 5/STEP 222). The "second specification operation" is, for example, an operation such as key touching, tapping or swiping on the remote input interface 210 for setting a schedule including scheduled start time (second scheduled start time) and scheduled end time (second scheduled end time) of a remote operation of the work machine 40 specified by the first specification operation.

If a result of the determination is negative (FIG. 5/STEP 222: NO), a process of and after the determination about whether the first specification operation has been performed or not (FIG. 5/STEP 221) is repeated. On the other hand, if the result of the determination is positive (FIG. 5/STEP 222: YES), specification operation information is transmitted to the remote operation assistance server 10 through the remote wireless communication equipment 222 (FIG. 5/STEP 223). The specification operation information includes a remote identifier for identifying the remote operation apparatus 20, the work machine identifier for identifying the work machine 40 specified by the first specification operation, the schedule including the second scheduled start time and the second scheduled end time of the remote operation, which has been specified by the second specification operation.

In the remote operation assistance server 10, when the specification operation information is received (FIG. 5/C120), the specification operation information is registered with the database 102 (FIG. 5/STEP 120).

In the remote operation assistance server 10, the operator of the remote operation apparatus 20 as the second remote operation apparatus is selected by the first assistance processing element 121 (FIG. 5/STEP 121). For example, by an inquiry to the database 102, a remote operation schedule of the work machine 40 is referred to, and an operator or remote operation apparatus to remotely operate the work machine 40 after the first remote operation apparatus is selected. If the operator to remotely operate the work machine 40 after the first remote operation apparatus is the operator to operate the second remote operation apparatus, the availability information is transmitted (FIG. 5/STEP 122).

In the remote operation apparatus 20, when the availability information is received through the remote wireless communication equipment 222 (FIG. 5/C221), a screen for confirming whether a remote operation is intended or not is outputted on the image output device 221 by the remote control device 200 (FIG. 5/STEP 224). For example, a screen for confirming that a remote operation of the work machine 40 is to be started is outputted on the image output device 221. A work environment image (video) corresponding to work environment image data corresponding to a predetermined period in the past may be outputted together on the image output device 221.

It is determined by the remote control device 200 whether an intention expression operation through the remote input interface 210 has been made or not by the remote control device 200 (FIG. 5/STEP 225). For example, a selection operation by tapping one of buttons constituting an intention confirmation screen outputted on the image output device 221 or the like corresponds to the intention expression operation. For example, if it is determined that an intention expression operation has been performed within a specified period, it is determined that a result of the determination is positive. If the result of the determination is positive, a positive intention confirmation result is transmitted to the remote operation assistance server 10 by the remote control device 200 through the remote wireless communication equipment 222 (FIG. 5/STEP 226). On the other hand, if it is successively determined that an intention expression operation has not been performed within the specified period, the result of the determination is negative. If the result of the determination is negative, a negative intention confirmation result is transmitted to the remote operation assistance server 10 by the remote control device 200 through the remote wireless communication equipment 222 (FIG. 5/STEP 226). The specified period is set, for example, as a time during which fuel consumption in the case of turning the engine 460 of the work machine 40 to OFF at the first scheduled end time and turning the engine 460 to ON again at the second scheduled start time exceeds fuel consumption in the case of continuing keeping the engine 460 of the work machine 40 ON from the first scheduled end time to the second scheduled start time.

In the remote operation assistance server 10, when the intention confirmation result is received (FIG. 5/C122), it is determined by the second assistance processing element 122 whether the intention confirmation result is positive or negative (FIG. 5/STEP 2123). If the intention confirmation result is negative (FIG. 5/STEP 123: NO), an engine operation stop instruction is transmitted to the work machine 40 by the second assistance processing element 122 (FIG. 5/STEP 128). In the work machine 40, when the engine operation stop instruction is received through the work machine wireless communication equipment 422 (FIG. 5/C422), the engine 460 of the work machine 40 is switched from ON to OFF by the work machine control device 400 (FIG. 5/STEP 422). Thereby, supply of the primary pressure oil from the pilot pump to the work machine operation mechanism 411 is stopped, and the turning mechanism 430 and the work mechanism 440 are into an inoperable state even if the work machine operation mechanism 411 is moved according to a remote operation instruction.

On the other hand, if the intention confirmation result is positive (FIG. 5/STEP 123: YES), an engine operation continuation instruction is transmitted to the work machine 40 by the second assistance processing element 122 (FIG. 5/STEP 124). In the work machine 40, when the engine operation continuation instruction is received through the work machine wireless communication equipment 422 (FIG. 5/C421), the engine 460 of the work machine 40 is kept ON by the work machine control device 400 (FIG. 5/STEP 421). Thereby, the state of the primary pressure oil being supplied from the pilot pump to the work machine operation mechanism 411 is continued.

Furthermore, in this case, a remote operation enabled notification is transmitted to the remote operation apparatus 20 as the second remote operation apparatus, by the second assistance processing element 122 (FIG. 5/STEP 126). In the second remote operation apparatus, when the remote operation enabled notification is received by the remote control device 200 through the remote wireless communication equipment 222 (FIG. 5/C222), the notification is outputted on the image output device 221 (FIG. 5/STEP 227). Thereby, the work machine 40 can be remotely operated by the remote operation apparatus 20 as the second remote operation apparatus according to the flowchart shown in FIG. 4 (FIG. 4/STEP 41→STEP 412→C112→STEP 112→C210→STEP 215→STEP 216→STEP 217→C113→C412→STEP 414). However, the engine 460 does not have to be switched from OFF to ON (see FIG. 4/STEP 410).

(Effect)

According to the remote operation assistance system in the above configuration and the remote operation assistance server 10 constituting the remote operation assistance system, when a remote operation of a work machine 40 through one remote operation apparatus 20 as a first remote operation apparatus is stopped by one operator, operation of the engine 460 of the work machine 40 is stopped if another operator who may possibly continuously remotely operate the same work machine 40 through another remote operation apparatus 20 as a second remote operation apparatus does not exist (see FIG. 5/STEP 225: NO→END, C122→STEP 128→C422→STEP 422).

On the other hand, when a remote operation of a work machine 40 through one remote operation apparatus 20 as a first remote operation apparatus is stopped by one operator, operation of the engine 460 of the work machine 40 is continued without being stopped if another operator who may possibly continuously remotely operate the same work machine 40 through another remote operation apparatus 20 as a second remote operation apparatus exists (see FIG. 5/STEP 225: YES→STEP 226→C122→STEP 124→C421→STEP 421). Therefore, the other operator can immediately remotely operate the work machine 40 through the second remote operation apparatus without causing the engine 460 of the work machine 40, which has been an operation target of the first remote operation apparatus so far, to restart and perform warm-up operation. Therefore, when the same work machine 40 is remotely operated by different operators or through different remote operation apparatuses 20, work of the work machine 40 can be smoothly performed.

Other Embodiments of the Present Invention

The first assistance processing element 121 may further confirm scheduled start time of a remote operation of a work machine 40 by an operator of a second remote operation apparatus, and the second assistance processing element 122 may, after receiving a remote operation stop notification (a remote operation stop instruction) for the work machine 40 from a first remote operation apparatus (see FIG. 4/C114), cause operation of the engine 460 of the work machine 40 to continue on condition that a time interval until the scheduled start time of the remote operation is equal to or shorter than a specified time interval (see FIG. 5/STEP 124).

According to the remote operation assistance server 10 in the above configuration, if, when a remote operation of a work machine 40 through a first remote operation apparatus is stopped by one operator, another operator who may possibly continuously remotely operate the same work machine 40 through a second remote operation apparatus exists, but a time interval until scheduled start time (second scheduled start time) of the remote operation by the other operator is long enough to exceed the specified time, operation of the engine 460 of the work machine 40 is stopped. Therefore, it is possible to avoid a situation in which the engine of the work machine 40 operates for an excessively long period without being remotely operated.

On the other hand, if, when a remote operation of a work machine 40 through a first remote operation apparatus is stopped by one operator, another operator who may possibly continuously remotely operate the same work machine 40 through a second remote operation apparatus exists, and a time interval until scheduled start time of the remote operation by the other operator is short enough not to exceed the specified time interval, the operation of the engine 460 of the work machine 40 is continued without being stopped. Therefore, the other operator can immediately remotely operate the work machine 40 through the second remote operation apparatus without causing the engine 460 of the work machine 40, which has been an operation target of the first remote operation apparatus so far, to restart and perform warm-up operation. Therefore, when the same work machine 40 is remotely operated by different operators or through different remote operation apparatuses, work of the work machine 40 can be smoothly performed.

The second assistance processing element 122 may cause operation of the engine of a work machine 40 to continue or stop according to a specified time interval determined to be continuously or gradually longer as environment temperature of the work machine 40 is lower.

In this case, when a remote operation of the work machine 40 through a first remote operation apparatus is stopped by one operator, operation of the engine is continued for a longer time as environment temperature of the work machine is lower even if a time interval until a scheduled start time of a remote operation by another operator who may possibly continuously remotely operate the same work machine 40 is relatively long. Therefore, it is possible to reduce necessity to perform warm-up operation for a relatively long time after restart of the engine because operation of the engine of the work machine is stopped relatively earlier, and enable start of the remote operation of the work machine 40 early. Therefore, when the same work machine 40 is remotely operated by different operators or through different remote operation apparatuses 20, work of the work machine 40 can be smoothly performed.

In the above embodiment, availability information is transmitted to a remote operation apparatus 20 of a selected operator (see FIG. 5/STEP 122). However, when scheduled start time (second scheduled start time) for a remote operation by an operator or a remote operation apparatus that remotely operates a work machine 40 after a first remote operation apparatus is after a specified time or more after scheduled end time (first scheduled end time) of a remote operation of the work machine 40 by the first remote operation apparatus, the applicability information may not be transmitted. For example, the specified time is a time during which fuel consumption in the case of turning the engine of the work machine 40 to OFF at the first scheduled end time and turning the engine to ON again at the second scheduled start time exceeds fuel consumption in the case of continuing keeping the engine of the work machine 40 ON from the first scheduled end time to the second scheduled start time.

The first assistance processing element 122 acquires picked-up image data indicating an operation state and a surrounding environment of a work machine, the picked-up image data being acquired through the image pickup apparatus, causes the remote output interface 220 of a second remote operation apparatus to output a work environment image corresponding to the picked-up image data and then confirms whether the possibility of the remote operation of the work machine 40 by the operator of the second remote operation apparatus exists or not, based on communication with the second remote operation apparatus.

In this case, it is possible to cause the operation state and the surrounding environment of the work machine 40 remotely operated by one operator through a first remote operation apparatus to be recognized by another operator and cause the other operator to decide whether or not to continuously remotely operate the same work machine 40 through the second remote operation apparatus. Since it is possible for the other operator to take over the remote operation of the work machine 40 after recognizing the operation situation and surrounding environment of the work machine 40, the other operator can immediately start and continue the remote operation of the work machine 40 without an uncomfortable feeling. Therefore, when the same work machine 40 is remotely operated by different operators or through different remote operation apparatuses 20, work of the work machine 40 can be smoothly performed.

REFERENCE SIGNS LIST

10 Remote operation assistance server
20 Remote operation apparatus (first remote operation apparatus, second remote operation apparatus)
40 Work machine
102 Database
121 First assistance processing element
122 Second assistance processing element
200 Remote control device
210 Remote input interface
211 Remote operation mechanism
212 Operator state sensor
220 Remote output interface
221 Image output device
400 Work machine control device
41 Work machine input interface
42 Work machine output interface
424 Cab (driving room)
440 Work mechanism (work attachment)
445 Bucket (work unit)
460 Engine

The invention claimed is:

1. A remote operation assistance server for assisting a remote operation of a work machine through a first remote operation apparatus by a first operator, and a remote operation of the work machine through a second remote operation apparatus different from the first remote operation apparatus by a second operator, the remote operation assistance server comprising:
a first assistance processing element which, when recognizing that a remote operation of the work machine by the first operator of the first remote operation apparatus ends, based on communication with at least one of the first remote operation apparatus and the work machine, confirms, based on communication with the second remote operation apparatus whether a possibility of a remote operation of the work machine through the second remote operation apparatus by the second operator of the second remote operation apparatus exists or not by determining whether an operation through an input interface of the second remote operation apparatus by the second operator for expressing an intention of a remote operation of the work machine exists or not; and
a second assistance processing element which, when it is confirmed by the first assistance processing element that the possibility of the remote operation of the work machine by the second operator of the second remote operation apparatus does not exist, stops operation of an engine of the work machine in response to receiving a remote operation stop instruction for the work machine being received from the first remote operation apparatus, and, when it is confirmed by the first assistance processing element that the possibility of the remote operation of the work machine by the second operator of the second remote operation apparatus exists, causes the operation of the engine of the work machine to continue even after receiving the remote operation stop instruction for the work machine from the first remote operation apparatus.

2. The remote operation assistance server according to claim 1, wherein
the first assistance processing element acquires picked-up image data indicating an operation state and a surrounding environment of the work machine, the picked-up image data being acquired through an image pickup apparatus, causes an output interface of the second remote operation apparatus to output a work environment image corresponding to the picked-up image data and then confirms whether the possibility of the remote operation of the work machine by the second operator of the second remote operation apparatus exists or not, based on communication with the second remote operation apparatus.

3. The remote operation assistance server according to claim 1, wherein
the first assistance processing element recognizes, in addition to whether the possibility of the remote operation of the work machine by the second operator of the second remote operation apparatus exists or not, scheduled remote operation start time when the possibility of the remote operation exists; and
if the possibility of the remote operation of the work machine by the second operator existing and the scheduled remote operation start time are confirmed by the first assistance processing element, the second assistance processing element causes the operation of the engine of the work machine to continue on condition that a time interval until the scheduled remote operation start time is equal to or shorter than a specified time interval, after receiving the remote operation stop instruction for the work machine from the first remote operation apparatus.

4. The remote operation assistance server according to claim 3, wherein the second assistance processing element causes the operation of the engine of the work machine to continue or stop according to the specified time interval determined to be continuously or gradually longer as environment temperature of the work machine is lower.

5. A remote operation assistance system comprising the remote operation assistance server, the first remote operation apparatus, and the second remote operation apparatus according to claim 1.

6. A remote operation assistance method for assisting a remote operation of a work machine through a first remote operation apparatus by a first operator, and a remote operation of the work machine through a second remote operation apparatus different from the first remote operation apparatus by a second operator, the remote operation assistance method comprising:

a first assistance process of, when recognizing that a remote operation of the work machine by the first operator of the first remote operation apparatus ends, based on communication with at least one of the first remote operation apparatus and the work machine, confirming, based on communication with the second remote operation apparatus whether a possibility of a remote operation of the work machine through the second remote operation apparatus by the second operator of the second remote operation apparatus exists or not by determining whether an operation through an input interface of the second remote operation apparatus by the second operator for expressing an intention of a remote operation of the work machine exists or not; and a second assistance process of, when it is confirmed by execution of the first assistance process that the possibility of the remote operation of the work machine by the second operator of the second remote operation apparatus does not exist, stopping operation of an engine of the work machine in response to receiving a remote operation stop instruction for the work machine being received from the first remote operation apparatus, and, when it is confirmed by the first assistance process that the possibility of the remote operation of the work machine by the second operator of the second remote operation apparatus exists, causing the operation of the engine of the work machine to continue even after receiving the remote operation stop instruction for the work machine from the first remote operation apparatus.

* * * * *